2,997,366
GAS PURIFICATION
Edgar James Owens, El Sobrante, and Dwight L. Teeter, Taft, Calif., assignors to California Research Corporation, San Francisco, Calif., a corporation of Delaware
Filed Sept. 30, 1959, Ser. No. 843,414
3 Claims. (Cl. 23—3)

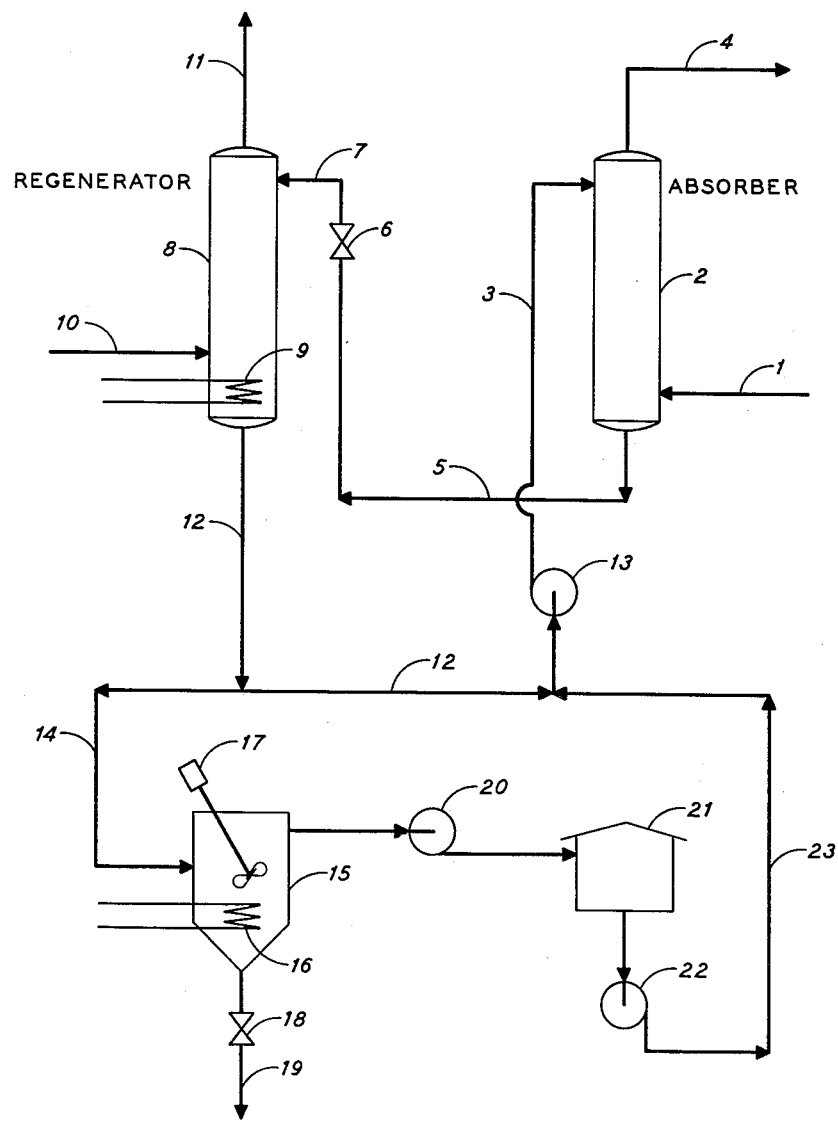
INVENTORS
E. JAMES OWENS
DWIGHT L. TEETER

This invention relates to an improved process for removing carbon dioxide and/or hydrogen sulfide from gaseous streams. More particularly, the invention is concerned with a process employing a circulating aqueous potassium carbonate solution to absorb $CO_2$ and $H_2S$ from gases.

Many processes are in commercial use for the removal of the acid gases, $H_2S$ and $CO_2$ from gaseous streams by reaction with, or absorption in, an alkaline reagent-containing solution. Examples of gases requiring such purification or by-product recovery are natural gas, by-product hydrogen gas, synthesis gases, and tthe like. One such purification process recently finding increased application in this country employs as the absorption medium a hot concentrated aqueous potassium carbonate solution which use is described for example, in Patent No. 2,886,405. Where complete removal of the acid gases is not required, this system affords significant heat and equipment economies over other processes, in that absorption and regeneration are effected at very nearly the same temperature. The basic process flow scheme comprises maintaining the carbonate solution in continuous circulation between an absorption zone, wherein the solution is enriched by absorption of the acidic gases under the influence of elevated pressure, and a regeneration zone, wherein the gases are released from the rich solution under the influence of reduced pressure, yielding a "lean" solution which is then recycled to the absorption zone.

It has been observed that in the operation of such processes finely-divided solids appear in the circulating solution. Slip stream filters are often provided for the removal of entrained gross solids. However, such means are ineffective for the removal of dissolved solids. By "dissolved solids" is meant any relatively insoluble materials which are not present in sufficient concentration to form a precipitate at the solution temperature, or which are of such a finely-divided nature as not to be readily susceptible to filtration. Such dissolved solids are formed by side reactions between the acidic gases and the $K_2CO_3$ to form nonregenerable compounds, mainly sulfates when, as is often the case, minor amounts of oxygen find their way into the treating system.

The sulfate, if allowed to build up in the solution, will ultimately precipitate in the form of a sludge or scale, which fouls heat transfer surfaces, plugs instrument leads, and impedes efficient operation of the contacting apparatus. The presence of the sulfates is also believed to accelerate corrosion and pump impeller erosion. Furthermore, the presence of extraneous dissolved solids appeared to result in excessive entrainment within the columns and a reduction in the contacting efficiency.

It is an object of this invention to provide an improved process for carrying out the removal of acidic gases from gaseous streams using a continuously circulated potassium carbonate scrubbing solution. A further object is to provide a method for the simultaneous removal of $CO_2$ and $H_2S$ from normally gaseous hydrocarbon streams using an aqueous potassium carbonate solution. It is a particular object of this invention to prevent the precipitation of solids in the contacting equipment by preventing the build-up of dissolved solids in the circulating solution.

Briefly, the invention comprises withdrawing a portion of the circulating aqueous potassium carbonate scrubbing solution to a settling zone of relatively large residence time maintained at a temperature below the lowest temperature in the circulating system. Preferably the temperature is maintained above the temperature at which the alkaline reagent itself precipitates from solution. However, in some instances it may be desirable to permit some precipitation of the active ingredient, as where the solid contaminants themselves have appreciable solubility. The precipitate which forms in the settling zone is periodically withdrawn from the bottom of the vessel, and the supernatant liquid is, after enrichment with $K_2CO_3$, if necessary, returned to the circulating stream.

Reference is now made to the attached drawing which illustrates a specific embodiment of the invention wherein an aqueous potassium carbonate solution is utilized for removing carbon dioxide and hydrogen sulfide from a gas.

The feed gas, e.g., natural gas, by-product hydrogen, synthesis, gas, etc., is fed at an elevated pressure on the order of 200 to 500 p.s.i.g. through line 1 to the bottom of absorption zone 2. Absorption zone 2 may comprise any conventional gas-liquid contacting device, such as a spray column, a Raschig ring column, or a distillation column equipped with perforated or bubble-cap trays. The feed gas passes upward through the contacting apparatus countercurrent to a descending stream of aqueous potassium carbonate solution which enters at the top of absorption zone 2 through line 3. Preferably, the contacting solution contains 25–40 weight percent potassium carbonates, expressed as $K_2CO_3$, and is supplied at a temperature between 100 and 300° F. In contacting zone 2 the principal reactions occurring are the conversion of $K_2CO_3$ to $KHCO_3$ and KHS by reaction with the $CO_2$ and $H_2S$ in the gas. Where oxygen is present in the feed gas, $K_2SO_4$ may also be formed. Purified gas substantially reduced in $CO_2$ and $H_2S$ content is recovered through line 4.

Potassium carbonate solution enriched in $CO_2$ and $H_2S$ content is withdrawn through line 5 and passed through pressure reduction valve 6 and line 7 to regeneration zone 8, which, like the absorption zone 2, may comprise any conventional gas-liquid contacting apparatus. The regeneration zone 8 is preferably equipped with an external reboiler or a heating coil 9 to vaporize water and to provide an upflowing strippand gas. If desired, stripping steam may also be added through line 10. Regeneration zone 8 is maintained at a substantially reduced pressure of the order of 1 to 3 atmospheres and at an elevated temperature in the range 150 to 300° F. Under these conditions the $KHCO_3$ and KHS are decomposed to yield $K_2CO_3$ and the acidic gases, $CO_2$ and $H_2S$. The recovered gases together with stripping steam leave the top of regeneration zone 8 through line 11, and regenerated or so-called "lean" solution is withdrawn through line 12. It is not essential that the carbonate be completely regenerated to $K_2CO_3$, and the lean solution will contain a residual amount of $KHCO_3$ and KHS.

In the particular embodiment shown, commonly termed the hot carbonate process, heat exchange between the lean solution in line 3 and the rich solution in line 5 is not required, and the mixture of stripping steam and desorbed gases in line 11 may be vented to the atmosphere if recovery of the $CO_2$ or $H_2S$ is not desired.

The major portion of the lean regenerated solution is recycled via pump 13 and line 3 to absorption zone 2. A minor portion of the lean regenerated solution is withdrawn from time to time or continuously through line 14 to settling zone 15, which in the specific embodiment shown is a cone-bottomed settling tank. Tank 15 may desirably be equipped with cooling coils 16 and mixer 17, the latter being only intermittently operated as a means of preventing super-saturation of the solution, since the primary function of the tank is to effect settling. Cooling coils 16 are desirably piped-up for alternate use as heating coils. Thus, the same heat transfer device may be used for cooling of the solution to effect precipitation and then later be used for heating to aid in slurrying of the collected solids for convenient disposal. The temperature in zone 15 during precipitation is maintained as low as conveniently practicable, without precipitating potassium carbonate or bicarbonate, in order to minimize the residual dissolved solids content of the supernatant liquid and thereby to minimize the relative amount of the solution inventory which must be processed through the precipitation zone.

Solid material which collects at the bottom of the conical section is periodically mixed with water and withdrawn through valve 18 and line 19 as a slurry. Purified potassium carbonate solution is decanted through line 20. In a preferred embodiment this material passes to make-up tank 21 where the solution is brought to the desired normality by the addition of potassium carbonate and/or water prior to reintroduction to the circulating stream via pump 22 and line 23.

EXAMPLE

In this example, natural gas from a mid-California well was separated from heavier constituents by vacuum-flashing in what are known in the trade as crude traps. The natural gas, which had the $CO_2$ and $H_2S$ content shown in Table I, was compressed and fed at the rate 37.5 million standard cubic feet per day to a purification process where it was contacted with 500 g.p.m. of an aqueous solution containing 30 weight percent potassium carbonate, expressed as $K_2CO_3$. Operating conditions in the gas purification system are also shown in Table I. Lean regenerated solution was intermittently withdrawn to a 4200 gallon cone-bottomed settling tank at the rate of 250 gallons per 8-hour period. When 3,000 gallons of solution had been collected, and the temperature had dropped to about 100° F., 400 pounds of solid material (largely $K_2SO_4$) was found to have precipitated. Calculations indicate that this material comprised substantially all of the $H_2S$ in the feed. The supernatant solution was then pumped to a separate tank where additional $K_2CO_3$ was added to give a 30 weight percent solution. Portions of this solution were periodically returned to the circulating contacting stream in order to compensate for the portions withdrawn to the settling zone and thereby to maintain the circulating solution inventory.

Table I

| Natural gas feed: | |
|---|---|
| Vol. percent $CO_2$ | 9.3 |
| Vol. percent $H_2S$ | $6.4 \times 10^{-4}$ |
| Natural gas effluent: | |
| Vol. percent $CO_2$ | 3.9 |
| Vol. percent $H_2S$ | nil |
| Absorption zone pressure, p.s.i.g. | 410 |
| Absorption zone temperature, °F. | 240 |
| Regeneration zone pressure, p.s.i.g. | 13.3 |
| Regeneration zone temperature, °F. | 246 |

When the use of a precipitation and setting zone in accordance with the invention was not practiced, the concentration of nonregenerable salts in the carbonate solution built up continually over a period of time to a point where dissolution and deposition of solids occured in relatively stagnant locations in the circulating system, such as instrument leads, level indicators, and the like.

We claim:

1. In a process for the removal of slightly acidic gases selected from the group consisting of $CO_2$ and $H_2S$ from a gaseous stream containing at least one of said gases which comprises maintaining an aqueous potassium carbonate scrubbing solution in continuous circulation between an absorption zone and a regeneration zone, contacting said gas with said solution in the absorption zone at an elevated pressure of 200–500 p.s.i.g. and a temperature between 100 and 300° F. whereby acidic gases are absorbed, and passing the enriched solution to the regeneration zone maintained at a substantially reduced pressure of 1–3 atmospheres and a temperature between 150 and 300° F., whereby absorbed gases are released from said solution, the improvement of removing non-regenerable by-products including sulfates from the regenerated circulating solution by passing a portion of said solution to a settling zone maintained at a temperature sufficiently below the lowest temperature in said absorption and regeneration zones to cause said by-products to collect as a precipitate but above the temperature at which a substantial amount of $KHCO_3$ is precipitated and removing the precipitated by-products from said settling zone.

2. The method of claim 1 wherein the supernatant liquid from said settling zone is returned to the circulating stream.

3. The method of claim 1 wherein supernatant liquid from said settling zone is returned to the circulating stream together with added $K_2CO_3$ in an amount corresponding substantially to the amount of alkali-metal ion removed as the sulfate.

References Cited in the file of this patent

UNITED STATES PATENTS 2,886,405    Benson et al. _____ May 12, 1959